United States Patent [19]

Kusters et al.

[11] 3,849,727

[45] Nov. 19, 1974

[54] CURRENT COMPARATOR FOR POWER AND ENERGY MEASUREMENTS

[75] Inventors: Norbert L. Kusters; William J. M. Moore, both of Ottawa, Ontario, Canada

[73] Assignee: Canadian Patents and Development Limited, Ottawa, Ontario, Canada

[22] Filed: Aug. 10, 1973

[21] Appl. No.: 387,450

[52] U.S. Cl. .................................. 324/142, 324/74
[51] Int. Cl. ............................................. G01r 21/00
[58] Field of Search .............................. 324/142, 74

[56] References Cited
UNITED STATES PATENTS

| | | |
|---|---|---|
| 3,543,149 | 11/1970 | Friedl et al. ........................ 324/74 |
| 3,662,264 | 5/1972 | Hewlett .............................. 324/142 |
| 3,697,872 | 10/1972 | Schulz ............................... 324/142 |
| 3,710,254 | 1/1973 | Kusui ................................ 324/142 |
| 3,725,774 | 4/1973 | Stewart ............................. 324/142 |

Primary Examiner—Alfred E. Smith
Attorney, Agent, or Firm—Edward Rymek

[57] ABSTRACT

An instrument for the measurement of energy or power with a high degree of precision. The voltage and current components of the power are determined individually. The voltage component is measured using a precise instrument such as an AC/DC comparator. The current component is measured in a current comparator in which it is balanced against current obtained by applying the voltage component to a high quality resistor and a high quality capacitor. The instrument is especially useful in the calibration of wattmeters and watt-hour meters.

10 Claims, 1 Drawing Figure

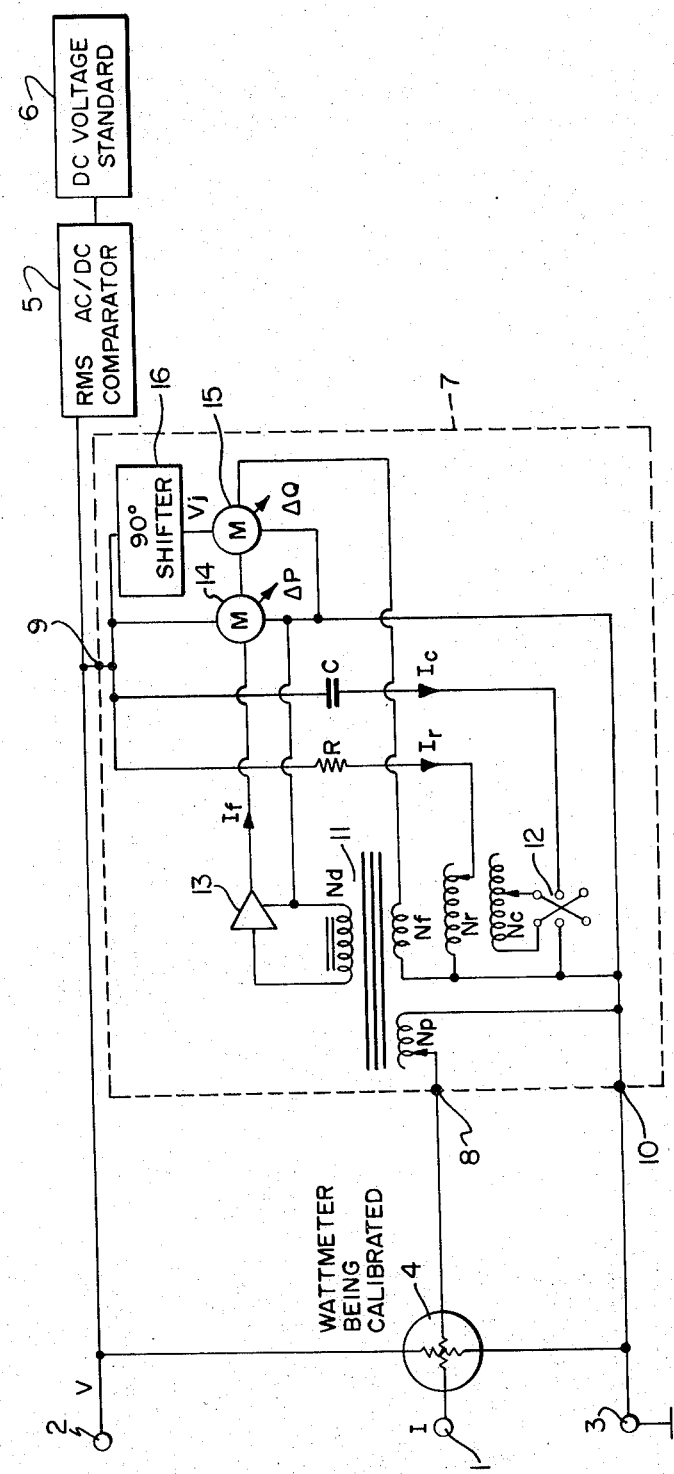

CURRENT COMPARATOR FOR POWER AND ENERGY MEASUREMENTS

This invention relates to the precision measurement of energy or power and in particular to a novel apparatus for measuring energy or power using a current comparator device.

Conventional methods of measuring power in A-C circuits include a variety of meters such as the electrodynamic wattmeter, the thermocouple wattmeter or the electrostatic wattmeter. These devices at best can provide an accuracy of 0.01 percent. Further, the calibration of meters can only be carried out by other meters of high quality which themselves do not surpass the 0.01 percent accuracy.

It is therefore an object of this invention to provide an apparatus which will achieve greater accuracy in power or energy measurements and wattmeter or watthour meter calibrations.

This and other objects are achieved by determining the voltage and current components of the power. The voltage component is measured by a precise instrument such as a RMS/DC comparator. The current component is measured in a current comparator by balancing it against currents obtained by applying the voltage component to a high quality resistor and a high quality capacitor.

In the drawings, the single FIGURE illustrates the power measuring circuit as used in the calibration of wattmeters.

The apparatus includes a constant current source (not shown) connected to terminals 1–3 which provides the current component I for wattmeter 4 and a constant voltage source (not shown) connected across terminals 2–3 which provides the voltage component V for the wattmeter 4. The voltage V is measured by an AC/DC comparator 5 which compares the voltage V to a DC Voltage Standard 6. An AC/DC comparator which may be used to carry out the voltage V measurement is described in a copending application Ser. No. 386,407 "Automatic AC/DC RMS Comparator" by L. G. Cox, N. L. Kusters and M. P. MacMartin, which was filed on Aug. 8, 1973. However any other method of accurately measuring the voltage V could be used. The apparatus further includes a current comparator 7, having a terminal 8 connected to the current source I through the wattmeter 4, a terminal 9 connected to the voltage source V and a terminal 10 connected to ground. The current comparator 7 may be of the type described in U.S. Pat. No. 3,188,562 issued to Justers, et al, on June 8, 1965.

Basically the current comparator includes a current transformer with variable primary winding $N_p$, variable secondary windings $N_r$ and $N_c$ and a detector winding $N_d$. The primary winding $N_p$ is connected between terminal 8 and ground terminal 10. Winding $N_r$ is connected between ground terminal 10 and terminal 9 through a high-quality resistor R. Winding $N_c$ is connected between ground terminal 10 and terminal 9 through a double-pole, double-throw switch 12 and a high-quality capacitor C. The switch is used to provide either a lag or a lead current as required. The detector winding $N_d$ is connected to a null detector. This basically constitutes the current comparator wherein the turns of winding $N_p$, $N_r$ and $N_c$ are manually adjusted to achieve a balance between the current component I and the currents $I_r$ and $I_c$ obtained by applying the voltage component V to resistor R and capacitor C respectively.

The current comparator may also include an automatic balance system wherein detector winding $N_d$ provides a high input impedance amplifier 13 with a signal whenever an imbalance is detected between $IN_p$, the ampere-turns of the current component I and the ampere-turns of the current through R and C $I_r N_r + I_c N_c$. The amplifier generates a current $I_f$ through winding $N_f$ returning the system into balance.

The balance equation for the current comparator is therefore:

$$IN_p = I_r N_r + I_c N_c + I_f N_f \tag{1}$$

Since:

$$I_r = V/R \text{ and}$$

$$I_c = V_j \omega C, \text{ equation (1) becomes:}$$

$$IN_p = V/R\, N_r + V_j \omega C\, N_c + I_f N_f \tag{2}$$

Multiplying equation (2) by $V/N_p$:

$$VI = V^2/R\, N_r/N_p + V_j^2 \omega C\, N_c/N_p + VI_f N_f/N_p \tag{3}$$

From equation (3) it is seen that $VI_f N_f/N_p = \Delta P + \Delta Q$ which represents the small changes in real and reactive powers to achieve balance; $(V^2/R)(N_r/N_p) = P_o$, the basic real power component; and $V^2 j \omega C\, N_c/N_p = Q_o$, the basic reactive power component. The power equation is therefore complete:

$$VI = Po + \Delta P + Qo + \Delta Q \tag{4}$$

$\Delta P$ may be determined by supplying $I_f$ and the voltage component $V$ to multiplier 14. $\Delta Q$ may be determined by supplying $I_f$ and the voltage component $V$ shifted in phase by 90° by shifter 16 to multiplier 15. The outputs for multiplier 14 and 15 adjusted by $N_f/N_p$ may take the form of dial readings or chart records. The basic real $P_o$ and reactive $Q_o$ power components may be calculated from the equation (3) since $V$, $R$, $N_r$, $N_p$, $\omega$, $C$ and $N_c$ are known or the apparatus may include a calculator which would allow direct readout of real and reactive power.

The automatic balancing system including windings $N_d$, $N_f$ and amplifier 13 may be used to bring the comparator into balance after $N_p$, $N_r$ and $N_c$ have been set at predetermined nominal values. However, the automatic balancing system has been found to be most effective in maintaining balance once achieved by adjusting $N_p$, $N_r$ and $N_c$ since most constant current sources which could be used to provide the current component I are found to be insufficiently constant.

Watt-hour meters may also be calibrated using this apparatus. The watt-hour meter is connected into the apparatus in the same manner as wattmeter 4 and readings are taken over a fixed interval of time. The watt-hour meter may then be calibrated since the time is known, $P$ may be obtained from the dial reading or chart record and $P_o$ may be calculated as above.

Though the system has been described in conjunction with the calibration of wattmeters of watt-hour meters, it may also be used to measure energy or power. To this end, wattmeter 4 is eliminated from the circuit.

The source supplying the power is connected across the apparatus, i.e., between terminals 2 and 3, in order to determine the voltage component $V$ and to apply $V$ to resistor $R$ and capacitor $C$. The load being driven by the source is effectively connected in series with winding $N_p$ either directly by connecting the load between terminals 8 and 9 or indirectly through a current transformer. This provides the current component to the current comparator. After balance is achieved in the current comparator, the power, real and reactive, and the energy may be calculated with an accuracy of up to 0.001 percent.

We claim:

1. An apparatus for measuring power which has a current component $I$ and a voltage component $V$, comprising:
   current transformer means having primary and secondary winding means;
   means for applying the current $I$ through the primary winding means;
   means for measuring the voltage $V$;
   impedance means connected in series with the secondary winding means;
   means for applying the voltage $V$ across the impedance means and the secondary winding means to provide a current therein; and
   means adapted to provide ampere-turns balance within said current transformer means to enable power determination in terms of the voltage $V$, the impedance means and the primary and secondary turns ratio of said transformer.

2. An apparatus as claimed in claim 1 wherein at least one of said winding means is variable.

3. An apparatus as claimed in section 2 wherein:
   the secondary winding means includes a first winding and a second winding;
   the impedance means is a quality resistor and a quality capacitor;
   the resistor is connected in series with the first winding across the voltage $V$; and
   the capacitor is connected in series with the second winding across the voltage $V$.

4. An apparatus as claimed in claim 3 wherein a switch is connected between the capacitor and the second winding to provide lag or lead current to the winding.

5. An apparatus as claimed in claim 3 including:
   a constant current source adapted to provide the current $I$; and
   a constant voltage source adapted to provide the voltage $V$.

6. An apparatus for measuring power which has a current component $I$ and a voltage component $V$, comprising:
   current transformer means having primary and secondary winding means, wherein at least one of said winding means is variable to enable ampere-turns balance and wherein said secondary winding means includes a first winding and a second winding;
   means for applying the current $I$ through the primary winding means;
   means for measuring the voltage $V$;
   impedance means including a quality resistor and a quality capacitor; said resistor connected in series with the first winding across the voltage $V$, and said capacitor connected in series with the second winding and a switch means across the voltage $V$ to provide a lag or lead current through the second winding;
   means for detecting ampere-turns imbalance in the current transformer means; and
   means for generating and applying a balancing current to the current transformer.

7. An apparatus as claimed in claim 6 wherein:
   the detecting means includes a detector winding in the current transformer means; and
   the balancing current generating means includes:
   amplifier means coupled to the detector winding and adapted to generate a balancing current; and
   a feedback winding in the current transformer means coupled to the amplifier means.

8. An apparatus as claimed in claim 7 including:
   means for determining the balancing current in terms of relative power.

9. An apparatus as claimed in claim 7 wherein the determining means includes:
   first and second multiplying means;
   means for applying the balancing current and the voltage $V$ to the first multiplying means;
   voltage shifting means;
   means for applying the voltage $V$ to the shifting means; and
   means for applying the balancing current and the shifted voltage to the second multiplying means.

10. An apparatus as claimed in claim 9 including:
    a constant current source adapted to provide the current $I$; and
    a constant voltage source adapted to provide the voltage $V$.

* * * * *